United States Patent
Retyunskiy et al.

(10) Patent No.: US 11,831,638 B1
(45) Date of Patent: Nov. 28, 2023

(54) SINGLE-PACKET AUTHORIZATION USING PROOF OF WORK

(71) Applicant: Amazon Technologies, Inc., Seattle, WA (US)

(72) Inventors: Evgeniy Retyunskiy, Bellevue, WA (US); Colm MacCárthaigh, Seattle, WA (US); Maciej Broda, Ottawa (CA); Matthew Schwartz, Fairfax Station, VA (US)

(73) Assignee: Amazon Technologies, Inc., Seattle, WA (US)

( * ) Notice: Subject to any disclaimer, the term of this patent is extended or adjusted under 35 U.S.C. 154(b) by 227 days.

(21) Appl. No.: 17/234,372

(22) Filed: Apr. 19, 2021

(51) Int. Cl.
*H04L 29/06* (2006.01)
*H04L 9/40* (2022.01)
*H04L 9/06* (2006.01)
*H04L 9/32* (2006.01)

(52) U.S. Cl.
CPC .......... *H04L 63/083* (2013.01); *H04L 9/0643* (2013.01); *H04L 9/3218* (2013.01)

(58) Field of Classification Search
USPC ............................................................ 726/6
See application file for complete search history.

(56) References Cited

U.S. PATENT DOCUMENTS

| | | |
|---|---|---|
| 7,600,255 B1 | 10/2009 | Baugher |
| 8,413,248 B2 | 4/2013 | Rash |
| 9,210,126 B2 | 12/2015 | Rash et al. |
| 9,705,895 B1 | 7/2017 | Gutzmann |
| 10,116,693 B1 | 10/2018 | Robinson et al. |
| 10,158,655 B2 * | 12/2018 | Pal ...................... H04L 63/0428 |
| 10,291,408 B2 | 5/2019 | Campagna et al. |
| 10,320,748 B2 | 6/2019 | Stair et al. |
| 10,715,471 B2 | 7/2020 | Giralte |
| 10,728,041 B2 | 7/2020 | Campagna et al. |
| 10,841,105 B2 | 11/2020 | Bohli et al. |
| 10,887,107 B1 | 1/2021 | Chan |
| 11,563,742 B2 * | 1/2023 | Stair ...................... G06F 21/45 |
| 2017/0093895 A1 * | 3/2017 | Pal ........................ G06F 21/552 |
| 2020/0067922 A1 * | 2/2020 | Avetisov ............. H04L 63/0823 |
| 2020/0074059 A1 * | 3/2020 | Beckett, Jr. ............. G06F 21/36 |

(Continued)

OTHER PUBLICATIONS

U.S. Appl. No. 17/119,640, filed Dec. 11, 2020, Maciej Broda.

*Primary Examiner* — Sanchit K Sarker
(74) *Attorney, Agent, or Firm* — Robert C. Kowert; Kowert, Hood, Munyon, Rankin & Goetzel, P.C.

(57) ABSTRACT

Methods, systems, and computer-readable media for single-packet authorization using proof of work are disclosed. An access control service receives, from a client, a single-packet authorization (SPA) request. The (SPA) request comprises output of a proof-of-work task, wherein completion of the proof-of-work task requires computational resources or memory resources of the client. The access control service performs verification of the output of the proof-of-work task using fewer computational or memory resources of the access control service than were used by the client. In response to determining that verification of the output of the proof-of-work task succeeds, the access control service performs authentication of the SPA request. In response to determining that authentication of the SPA request succeeds, the access control service allows access by the client device to a service.

20 Claims, 7 Drawing Sheets

(56) References Cited

U.S. PATENT DOCUMENTS

| | | |
|---|---|---|
| 2021/0067328 A1* | 3/2021 | Verheyen .............. H04L 9/0861 |
| 2021/0218720 A1* | 7/2021 | Oberhauser ......... H04L 63/0442 |
| 2021/0266303 A1* | 8/2021 | Pollutro .............. H04L 63/0435 |

* cited by examiner

US 11,831,638 B1

SINGLE-PACKET AUTHORIZATION USING PROOF OF WORK

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. As the scale and scope of distributed systems have increased, the tasks of provisioning, administering, and managing system resources have become increasingly complicated. For example, the costs to manage distributed resources can increase with the complexity and scale of the resources.

Figure 1A:
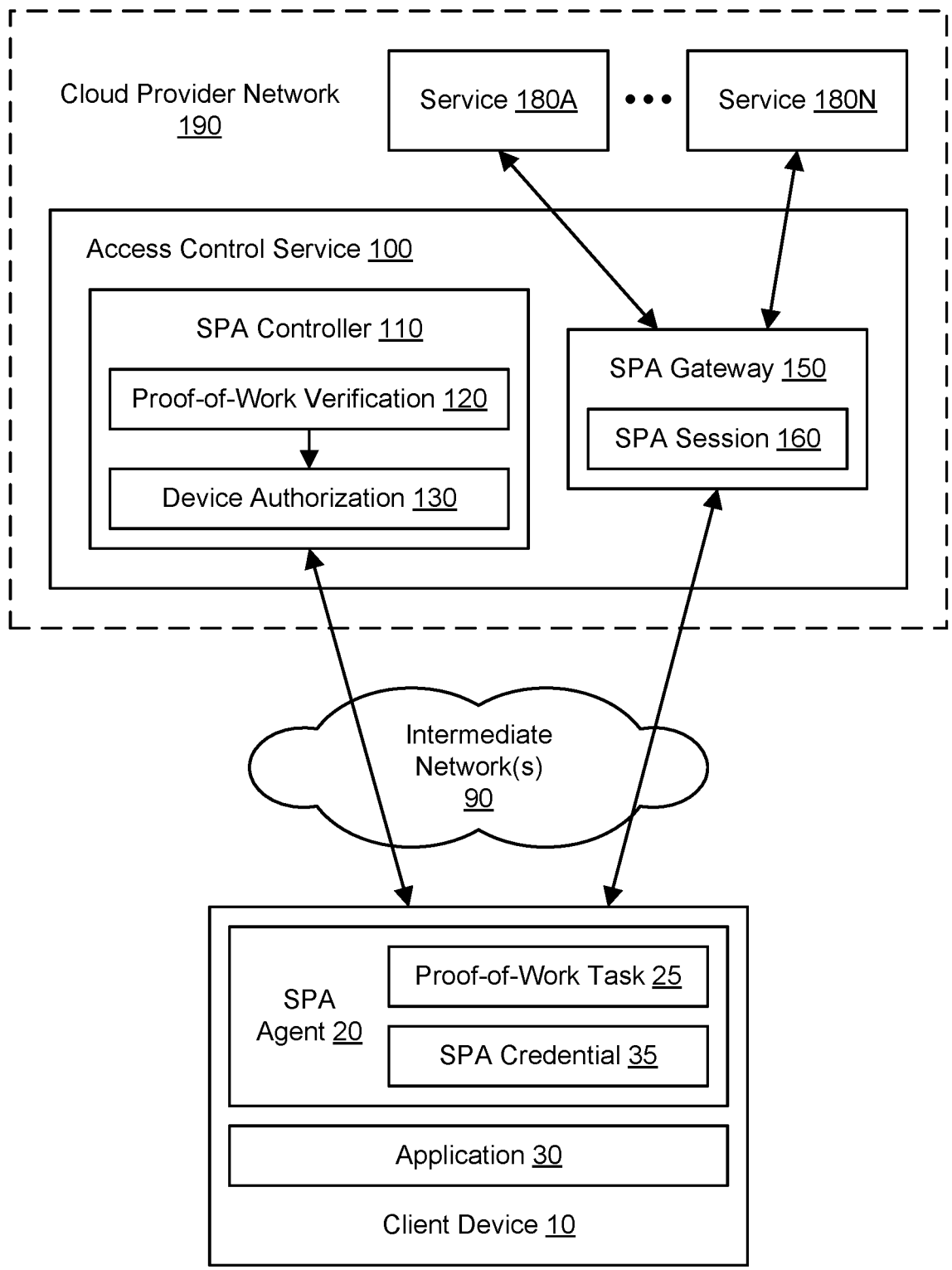
FIG. 1A and FIG. 1B illustrate an example system environment for single-packet authorization using proof of work, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for single-packet authorization using proof of work are described. Many organizations expose individual enterprise services directly on the Internet, leaving the services vulnerable to scanning, fingerprinting, exploitation, and distributed denial of service (DDoS) or other denial of service (DoS) attacks. The volume of illegitimate traffic handled by the external services may create noise that hides the actions of resourceful and determined adversaries that are actively working to penetrate open attack surfaces of these organizations. To address these challenges, an access control service may allow an enterprise to expose restricted services to authorized users outside of the enterprise perimeter while keeping the services invisible to and protected from unauthorized connections. The enterprise service footprint may remain visible only to those who are granted access such that the services remain protected from reconnaissance activities.

The access control service may introduce additional protection with a client device authorization layer that leverages single-packet authorization (SPA) techniques to allow an authorized client device to access the service while silently ignoring network traffic from unauthorized sources. An SPA request may include a single packet that can authenticate a user to a system. SPA may include a protocol for allowing a remote user to authenticate securely on a "closed" system (e.g., a system with limited or no open services) and make changes to or run applications on the "closed" system. The use of SPA may create a trusted device authorization layer around enterprise services. SPA may prevent a malicious actor from initiating a transport layer security (TLS) handshake before establishing a transmission control protocol (TCP) or user datagram protocol (UDP) connection. As such, SPA may be used to defeat multiple types of DoS attacks from unauthorized sources by significantly reducing resources required to shed the associated traffic at the service head-end, thereby reducing the impact while under attack and before any upstream DoS protection kicks in. Even if an attacker somehow obtained inside knowledge of the SPA, it may still require a significantly higher attacker cost to successfully overwhelm the servers without proper SPA authentication. Furthermore, SPA may also make reconnaissance more difficult for adversaries, because automated horizontal and vertical port scanning may require SPA credentials. However, in some circumstances, SPA components such as an SPA controller or SPA gateway may be vulnerable to DoS attacks in which SPA components are flooded with improper or failed SPA requests.

The aforementioned challenges, among others, are addressed by embodiments of the techniques described herein, whereby proof-of-work (PoW) tasks may be required of clients before SPA requests are authorized. In addition to traditional SPA-based payload authentication, an access control service may leverage a proof-of-work approach to mitigate attacks against SPA components such as an SPA controller and SPA gateway. Clients seeking authorization via SPA may be required to perform proof-of-work tasks and provide output of the tasks, e.g., as part of the SPA packet along with SPA credentials, before the client devices can be authorized via SPA. A proof-of-work task may be computationally challenging to perform by clients, often requiring significant computational resources and/or memory resources, while the output of the task may be much easier to verify by the access control service. For example, a proof-of-work task may require hundreds of milliseconds to perform, while checking the solution may require only microseconds. A variety of approaches may be used to require clients to provide proof of work. For example, a proof-of-work task may require the use of multiple secure hash functions whose output can be quickly checked. By introducing a proof-of-work challenge to be performed by clients, the computational cost and/or memory cost of crafting the SPA packet on the client side may become orders of magnitude higher than the server cost to validate the challenge. By increasing the cost of staging a successful DoS attack against the access control service, such an attack may be made less attractive to adversaries.

As one skilled in the art will appreciate in light of this disclosure, embodiments may be capable of achieving certain technical advantages, including some or all of the following: (1) improving the security of an SPA controller or SPA gateway by preventing or mitigating denial of service (DoS) attacks using proof-of-work challenges; (2) improving the security of a cloud provider network by requiring proof-of-work challenges before client access to the services is permitted; (3) improving the performance of an SPA controller by requiring clients to perform proof-of-work challenges that are much easier to verify than to perform; (4) improving the security of a cloud provider network by using SPA with proof-of-work requirements to redirect malicious actors to a deception environment in which intelligence can be gathered; and so on.

Figure 1B:
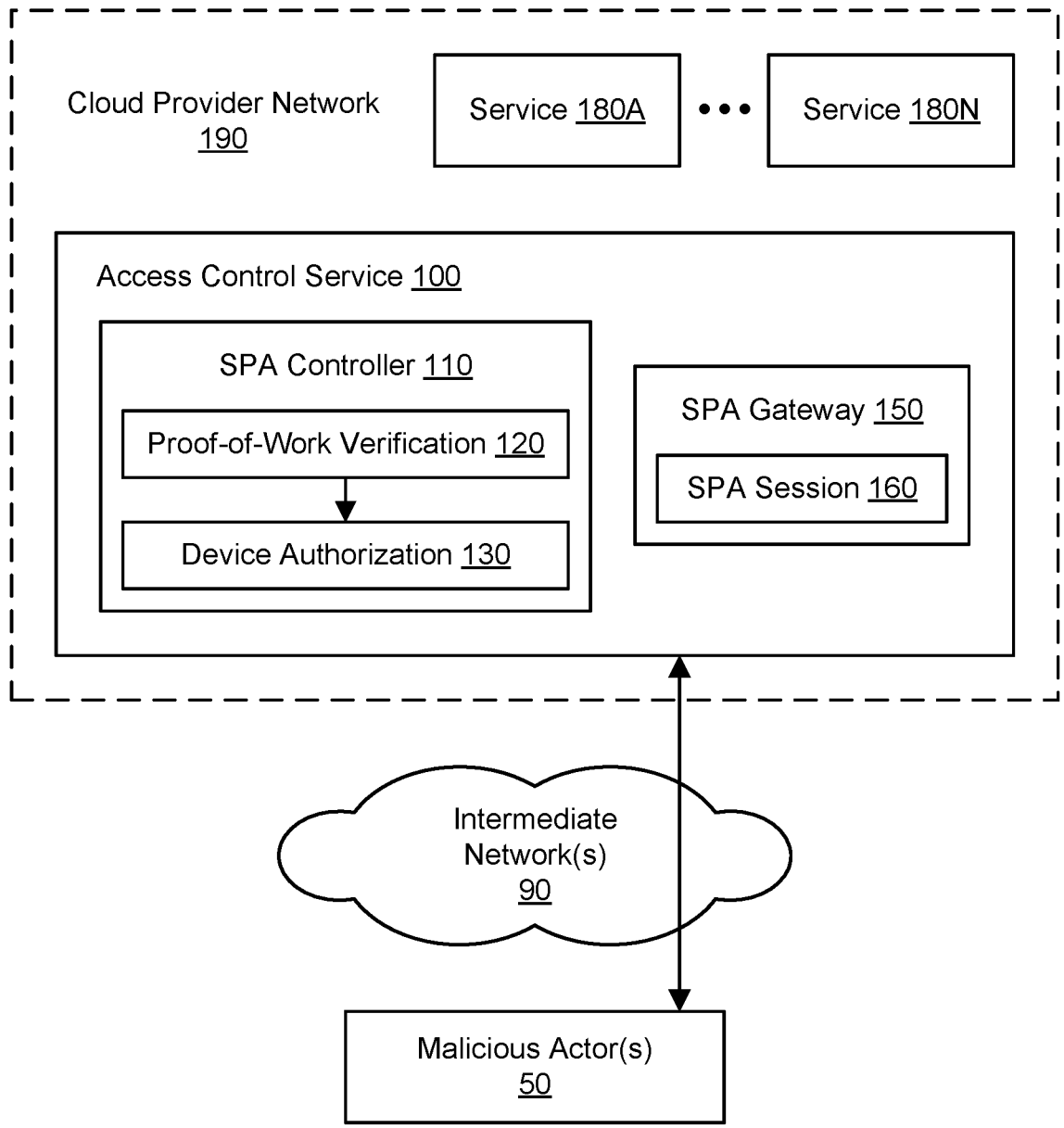

FIG. 1A and FIG. 1B illustrate an example system environment for single-packet authorization using proof of work, according to some embodiments. An access control service 100 may require would-be clients to perform proof-of-work tasks before authorizing single-packet authorization (SPA) requests. The access control service 100 may include components such as an SPA controller 110 and an SPA gateway 150. The access control service 100 may protect services 180A-180N in a cloud provider network 190 from malicious activities such as distributed denial of service (DDoS) attacks and other denial of service (DoS) attacks from sources such as malicious actor(s) 50, as shown in FIG. 1B. To enable legitimate clients such as client device 10 to access a particular service 180A, as shown in FIG. 1A, the access control service 100 may require the client 10 to perform a proof-of-work task 25 whose output can be easily checked by the SPA controller 110 using a proof-of-work verification component 120. Device authorization 130 via SPA may take place only if the output of a proof-of-work task 25 is verified by the access control service 100. The proof-of-work task 25 may be computationally challenging to perform by would-be clients, often requiring significant computational resources and/or memory resources, while the output of the task may be much easier to verify by the proof-of-work verification component 120. For example, a proof-of-work task 25 may often require hundreds of milliseconds to perform, while checking the solution may require only a few microseconds. A variety of approaches may be used for the proof of work, and those approaches may require the client 10 to use significant computational resources and/or memory resources to produce the requested output. For example, a proof-of-work task 25 may require the use of a variety of different secure hash functions whose output can be quickly checked. The output of the task 25 may be small enough to fit in a TCP or UDP packet. The expense associated with the proof-of-work requirement may dissuade malicious actor(s) 50 from attempting to initiate a DoS attack against the SPA controller 110 or SPA gateway 150.

Using SPA techniques, the access control service 100 may expose internal network services 180A-180N to enable access by clients over one or more intermediate network(s) 90 such as the Internet. The access control service 100 may not replace transport security and user authentication mechanisms that most of these services already implement, thereby allowing for fast and simple enterprise-wide deployment without necessarily requiring changes to the service stack. Instead, the access control service 100 may introduce additional protection with a client device authorization layer 130 that leverages single-packet authorization (SPA) techniques to allow an authorized client device 10 to access a service 180A while silently ignoring network traffic from unauthorized sources 50. In some embodiments, the service 100 can be configured to establish an SPA session 160 via a secure tunnel with session encryption between the client 10 and the gateway 150.

The access control service 100 may interact with a lightweight SPA agent 20 running on a client device 10. During enrollment, an SPA agent 20 may be provisioned with unique cryptographic credential(s) 35 that it presents to an SPA controller 110 in a lightweight SPA request. The SPA agent 20 may create an SPA request (e.g., an SPA packet) that represents the output of the proof-of-work task 25, an SPA credential 35, and other SPA-related data. The SPA controller 110 may perform verification 120 of the output of the proof-of-work task 25 in much less time (and/or with fewer resources) than the client device 10 took to generate that output. In response to determining that the verification 120 succeeds, the SPA controller 110 may attempt to perform authorization 130 of the client 10 via SPA. In response to determining that either proof-of-work verification 120 or device authorization 130 fails, then the access control service 100 may either silently ignore the attempt or deploy a deception and intelligence collection service. In response to determining that authorization 130 is successful, the service 100 may enable the client to access enterprise services 180A-180N allowed by policy and informed by the client security posture and context. For example, a user accessing the enterprise services from a WiFi hotspot with unpatched device 10 may be allowed to access an IT help desk and basic troubleshooting information, but the same user may be allowed access to more sensitive information once the user is in a secure location with all critical patches applied. Using both proof-of-work and SPA techniques, the access control service 100 may provide defenses against DDoS and DoS attacks. The access control service 100 may cloak the infrastructure so that only verified users such as client 10 (but not malicious actor(s) 50) can communicate with secure services 180A-180N. The access control service 100 may leave protected services invisible to port scans. The access control service 100 may permit protected services to use no additional resources to shed attack traffic.

An SPA request may include a single packet that can authenticate a user or device 10 to a system. SPA may include a protocol for allowing a remote user or device 10 to authenticate securely on a "closed" system (e.g., a system with limited or no open services) and make changes to or run applications on the "closed" system. The use of SPA may permit a trusted device authorization layer 130 around enterprise services 180A-180N. As such, SPA may be used to defeat multiple types of DoS and DDoS attacks from unauthorized sources 50 by significantly reducing resources required to shed the associated traffic at the service headend, thereby reducing the impact while under attack and before any upstream DDoS protection kicks in. For example, SPA may be used to mitigate "slow HTTP" attacks that are intended to exhaust server resources. Even if an attacker somehow obtains inside knowledge of the SPA, it may still require a significantly higher attacker cost to successfully overwhelm the servers without proper SPA authentication. Furthermore, SPA may also make reconnaissance more difficult for adversaries, because automated horizontal and vertical ports scanning may require SPA credentials.

If the SPA packet from a client 10 is successfully authenticated 130 following successful proof-of-work verification 120, the client may be permitted to establish a secure connection with the intended service (e.g., service 180A) via the SPA gateway 150 using an SPA session 160. In response to determining that either the proof-of-work verification 120 or the device authorization 130 via SPA fails, the access control service 100 may either silently ignore the attempt or deploy a deception and intelligence collection service. SPA may allow services to isolate, compartmentalize, and expose running services 180A-180N as little as possible to the broader Internet. Proof-of-work and SPA may allow the gateway 150 to shed unauthorized traffic without exerting resources and also link any misbehaving device to a user account to make the event actionable for security operations. The proof-of-work and SPA approaches may also make it significantly more costly for an adversary 50 to map out an organization's attack surface and find vulnerable services that could serve as a point of penetration.

Some prior approaches have used virtual private networks (VPNs) to provide a degree of security with respect to remote service access from outside am enterprise perimeter. The VPN approach may have several shortcomings that affect its scalability, performance, and network security. For example, the VPN approach may tunnel all client traffic through the enterprise, including chatty but secure built-in (e.g., operating system level) services, thus affecting scalability without providing much additional security. The VPN approach may open full access to the enterprise network, including network connectivity to potentially vulnerable services that the user does not need to access, but that offer attractive target to an attacker. The VPN approach may not offer flexibility in preserving performance and privacy of user applications that do not need to be tunneled through the enterprise network. The VPN approach may mask real-time services such as voice and video communication within the tunnel, thus preventing Quality of Service (QoS) prioritization end-to-end. Additionally, directly exposing services to the Internet may cause the service stack to be exposed to scanning by random parties and fingerprinting the service to identify vulnerable components. If service ports are always open, it may be much easier for the attackers to target and execute a successful DDoS attack.

In some embodiments, the access control service 100 may provide significant security benefits for secure services 180A-180N without requiring any changes to service architectures. In some embodiments, the access control service 100 may support using fully encrypted service tunnels or tying authorization directly into the service stack for the most sensitive services. Organized adversaries may pragmatically target systems that allow them to maximize their profit. By using the access control service 100 and the proof-of-work approach to make initial reconnaissance more difficult, a target service 180A may be made much less attractive at an early stage to malicious actor(s) 50.

To enable SPA, the access control service 100 may require a lightweight SPA agent 20 that performs a single-packet authorization exchange with the SPA controller 110 and can submit client posture data for evaluation. The agent 20 may craft an SPA packet that includes the output of the proof-of-work task 25 and the SPA credential(s) 35 for the device 10 along with other SPA-related data. Because SPA may be performed outside of session flow, the lightweight SPA client 20 may be separate from the client application 30 (e.g., it does not have to be a browser extension). Furthermore, the SPA model may work well with context-based access policy because the SPA controller 110 may adjust access permissions for the client based on its submitted posture data. By enabling SPA, the access control service 100 may increase adversary cost in accessing protected services from unauthorized devices. A variety of cryptographic mechanisms may be used for SPA, including using random values with digital signatures. Key management and derivation may likely be performed using a Signature Version 4 signing model. Key distribution may be accomplished by bundling keys and configurations to be distributed appropriately or in a self-service model with a user downloading an app and configuring it using a QR code. Key rotation may also be performed through the SPA controller 110, e.g., on every Nth client connection. A context-based access policy may allow the SPA controller 110 to leverage elements of client posture data, such as patch status, location, type of network the client 10 is connected through, and so on, to decide which services 180A-180N the client should be allowed to access in the particular session. For example, a client 10 may be allowed to access an IT help desk even if it misses some key patches and is connecting from a public WiFi network. However, the same client 10 may be blocked from accessing sensitive customer data for the same session.

In addition to traditional SPA-based payload authentication, the access control service 100 may also leverage a proof-of-work approach to prevent or mitigate attacks against components of the service 100 such as the SPA controller 110 and/or SPA gateway 150. By introducing a proof-of-work challenge to be performed by clients, the computational cost and/or resource cost of crafting the SPA packet on the client side may become orders of magnitude higher than the server cost to validate the challenge. By increasing the cost of staging a successful DoS attack against the access control service 100, such an attack may be made less attractive to adversaries, and the likelihood and magnitude of such attacks may be reduced.

In various embodiments, a variety of proof-of-work techniques may be used by the access control system 100 to dissuade DoS attacks. In some embodiments, the proof-of-work task 25 or the resulting SPA packet sent to the SPA controller 110 may be a function of SPA data. In some embodiments, the proof-of-work task 25 or the resulting SPA packet sent to the SPA controller 110 may be a function of connection parameters. In some embodiments, the proof-of-work task 25 or the resulting SPA packet sent to the SPA controller 110 may be a function of an epoch value representing a window of time. For example, let D=elements of SPA data from the SPA layer, such as the client device ID and the client device credential or the proof of possession of the credential. Let C=(cryptographic nonce value, destination IP, destination port) so that replay or redirection attacks can be prevented, where the nonce value represents a probabilistically unique value or value that is used only once. In some embodiments, the nonce value may be determined randomly or pseudo-randomly. In some embodiments, the nonce value may be determined using a host-specific prefix and a counter that is incremented over time.

Let T=(epoch mod 60) so that a packet cannot be replayed outside of a time window. In some embodiments, the proof-of-work output may be limited in size, e.g., due to TCP/UDP constraints and/or available space in the SPA packet. For example, in some embodiments, the proof-of-work output may be limited to 20 bits such that room remains for metadata (e.g., an identifier of the algorithm and the version number) in a 32-bit integer. In some embodiments, data to be authenticated via SPA 130 and the proof-of-work solution may be hashed and send to the SPA controller 110. Let HF=a hash function such as sha256. Let S =the proof-of-work solution. For example, the proof-of-work task 25 may involve finding S such that the first fourteen bits are zero. Then let H=HF(D, C, T, S), where the parameters to be authenticated (e.g., D, C, T) and the solution S may be hashed and sent by the client 10 to the SPA controller 110 in the SPA packet. The resulting hash may be verified by the SPA controller 110 almost instantly using the proof-of-work verification 120. In response to determining that the verification 120 is successful, the SPA controller 110 may then determine whether the client 10 should be authorized via SPA 130 for potential access to any of the services 180A-180N.

In some embodiments, a suitable proof-of-work approach by the service 100 may use an avalanche effect of cryptographic hash functions. Let $D=\{d_0 \ldots d_{m-1}\}$ representing m-bits data with $d_j$ being the $j^{th}$ bit of the data. Let $H(X)=\{h_0 \ldots _{n-1}\}$ representing an n-bits hash with $h_i$ being the $i^{th}$ bit of the hash of the hash. Let $S=\{s_0 \ldots d_{w-1}\}$ representing a w-bits solution with $s_k$ being the $k^{th}$ bit of the solution. Then let $S_w(D)=S$, such as $h_0 \ldots w_1=0$ for H(D, S). If any number of $s_k$ bits are flipped, then the probability $h_i$ flips is 0.5. Therefore $P(S_w(D)$ found in n trials$)=1-(1-\frac{1}{2}^w)^n$. For example, if w=14, then $P(S_{14}(D)$ found in n trials$)= 1-(1-\frac{1}{2}^{14})^n$. In some circumstances, a client device may often need tens of thousands (or more) of trials to solve such a problem, with fewer than 75,000 iterations required for 99% of cases.

In some embodiments, an application 30 on device 10 can access the services 180A-180N provided by provider network 190 via the lightweight SPA agent 20. For example, the application 30 can attempt to initiate a session with a service to check email, request a document, and perform other tasks requiring access to cloud resources. In some embodiments, this attempt may be performed in response to user input (e.g., a user accessing the application on their user device). The SPA agent 20 may intercept traffic from the device 10, including traffic from application 30. The SPA agent 20 may determine whether that traffic is associated with one of the services 180A-180N whose access is managed by access control service 100. If the traffic is not associated with one of the services, then the traffic may pass through to its destination. If the traffic is associated with one of the services, then it may be held by the SPA agent 20 until the user device 10 has been authorized using SPA, if it has not already been authorized. In some embodiments, the SPA agent 20 may be provisioned with unique cryptographic credentials that it presents to the access control service 100 in a lightweight SPA request. For example, the SPA agent 20 may provide access credentials and posture data to an SPA controller 110 of the access control service 100 using an authorization payload. In some embodiments, the authorization payload includes a unidirectional UDP packet (or other single packet). Alternatively, in some embodiments, a TLS handshake (e.g., multiple packets involved in TCP 3-way handshake) may precede the unidirectional packet as part of the authorization payload. As discussed herein, the SPA packet may include the output of a proof-of-work task.

The access control service 100 may perform authentication 130 for the device 10 and, if successful, enable access to enterprise services allowed by policy and informed by the client security posture and context. In various embodiments, a policy can identify time restrictions, originating network/IP restrictions, specific authorized services, and so on. For instance, a user accessing the enterprise services from an WiFi hotspot with an unpatched device may be allowed to access a limited number of services, such as the IT support help desk and basic troubleshooting information, but the same user may be allowed access to more sensitive information only after relocating to a secure location with any/all critical patches applied. Other posture claims that may be verified prior to allowing access may include, but are not limited to, device physical location (e.g., the services may only be accessed when the user device is located in one or more particular physical locations), connected wireless devices (e.g. determine whether other devices are connected to the user device via Bluetooth or other wireless connections, determine whether wireless connections are enabled, etc.), device/user biometrics, and so on. In some embodiments, the SPA controller 110 of the access control service 100 may return a session ticket to the SPA agent 20 based on the authentication and security policy associated with the user. The session ticket may indicate which services 180A-180N the user is authorized to access. In some embodiments, the access control service 100 may acknowledge the SPA request only if it is properly authenticated; otherwise the request may be silently dropped.

The SPA agent 20 may attempt to connect to a requested service using the session ticket. The SPA gateway 150 of the access control service 100 may then validate the ticket and provide session parameters that enable the SPA agent 20 to open a connection 160 to the requested service. Once the connection is opened, the traffic that was previously held by the SPA agent 20 may be passed through the open connection to the service. In some embodiments, the client 10 may be allowed access to a secure service (such as service 180A). In some embodiments, in response to determining that the session ticket does not provide access to the requested service, then the traffic may be ignored. In some embodiments, in response to determining that no session ticket is included with the request, then the access control service 100 may ignore the traffic entirely or redirect the traffic to a deception environment.

In some embodiments, the access control service 100 may offer single-packet authorization to client devices that provide hardware anchoring and/or additional attestation. For example, SPA may be used to provide access to services 180A-180N to a device that includes hardware credential(s) 35 or hardware-based attestation of device or user identity. Such a device may attempt to initiate a session with a service to perform a task requiring access to cloud resources. In some embodiments, this attempt may be performed without any user involvement. For example, an Internet of Things (IoT) device may attempt to connect to a service automatically to relay sensor data collected by one or more sensors of the IoT device. The device may be provisioned with suitable SPA credentials 35 to enable SPA authorization 130. In some embodiments, the SPA credentials 35 may be embedded in hardware of the device. In some embodiments, the credentials may be provisioned to the device on installation or registration with a backend system (e.g., a system to which the device is configured to send data). The device may be configured with an SPA agent 20 that can perform proof-of-work tasks 25 as discussed herein.

In one embodiment, one or more components of the access control service 100 may be implemented using resources of a provider network 190. Some implementations of the provider network 190 can be a cloud provider network. A cloud provider network 190 (sometimes referred to simply as a "cloud") refers to a pool of network-accessible computing resources (such as compute, storage, and networking resources, applications, and services), which may be virtualized or bare-metal. The cloud 190 can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 190 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network 190 via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network 190 may deliver content from points of presence outside of, but networked with, these regions by way of edge locations and regional edge cache servers (points of presence, or PoPs). This compartmentalization and geographic distribution of computing hardware enables the cloud provider network 190 to provide low-latency resource access to customers on a global scale with a high degree of fault tolerance and stability.

The cloud provider network 190 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

Computing service(s) may implement various computing resources at one or more data centers. The computing services can include an elastic compute cloud service (referred to in various implementations as an elastic compute service, a virtual machines service, a computing cloud service, a compute engine, or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. The disclosed placement techniques can select a suitable host for the requested instance type based at least partly on the described network performance metrics.

The computing services can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, other configurations) used to enable the application to run in a container engine. A container engine can run on a virtual machine instance in some implementations, with the virtual machine instance selected based at least partly on the described network performance metrics.

The traffic and operations of the cloud provider network 190 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

The cloud provider network 190 may implement the access control service 100, the protected services 180A-180N, and/or other services. Computing services may collaborate according to a service-oriented architecture, e.g., to perform complex tasks requiring contributions from various services. In some embodiments, one or more aspects of the access control service 100 may be implemented as a service of the provider network 190, the service may be implemented using a plurality of different instances that are distributed throughout one or more networks, and each instance may offer access to the functionality of the service to various clients. Because resources of the provider network 190 may be under the control of multiple clients (or tenants) simultaneously, the provider network may be said to offer multi-tenancy and may be termed a multi-tenant provider network.

Figure 6:
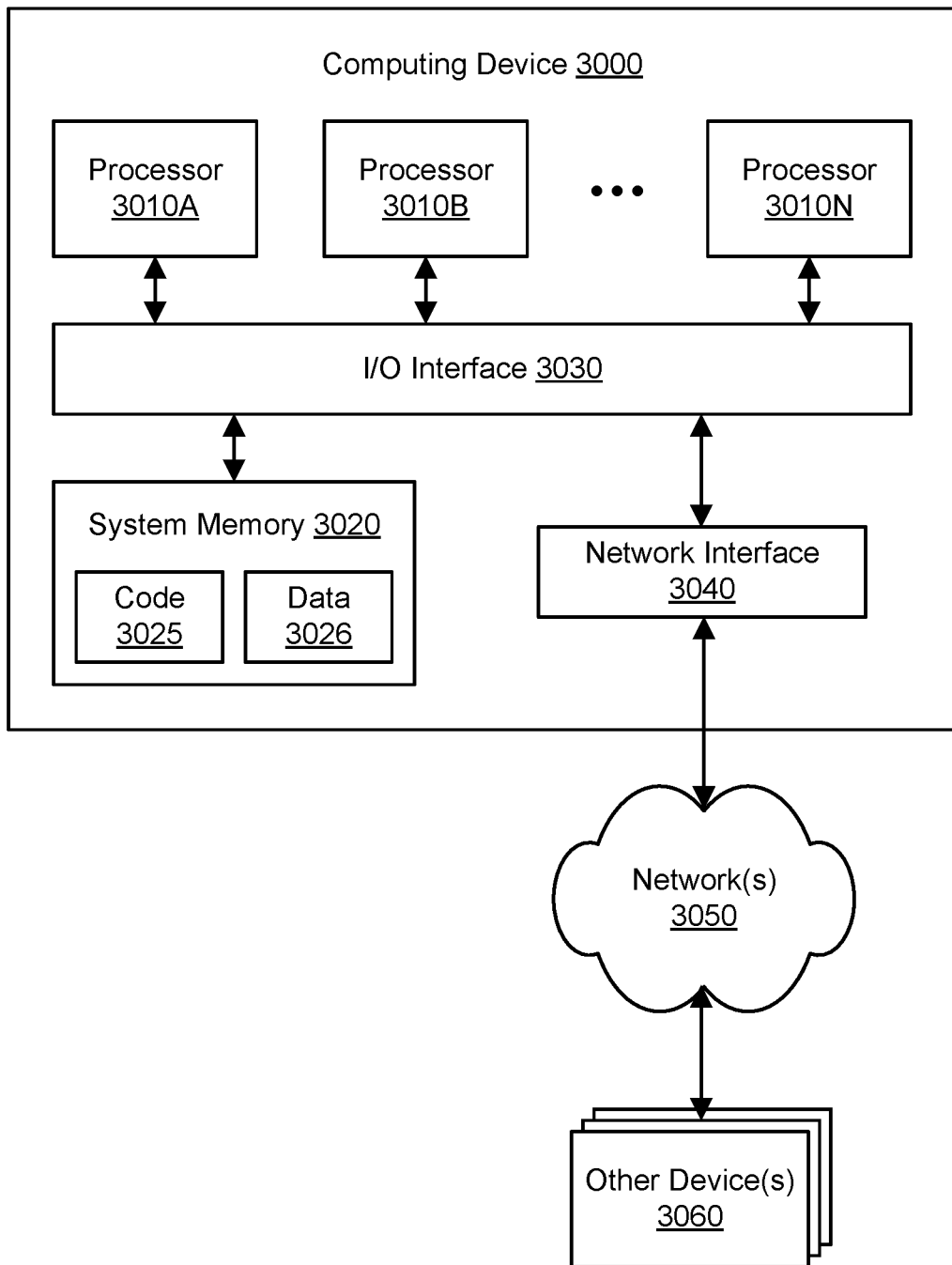
FIG. 6 illustrates an example computing device that may be used in some embodiments.

In various embodiments, components of the access control service 100 may be implemented using any suitable number and configuration of computing devices, any of which may be implemented by the example computing device 3000 illustrated in FIG. 6. In some embodiments, the computing devices may be located in any suitable number of data centers or geographical locations. In various embodiments, at least some of the functionality of the access control service 100 may be provided by the same computing device or by different computing devices. In various embodiments, if any of the components of the access control service 100 are implemented using different computing devices, then the components and their respective computing devices may be communicatively coupled, e.g., via one or more networks. Any of the components of the access control service 100 may represent any combination of software and hardware usable to perform their respective functions. In some embodiments, operations implemented by the access control service 100 may be performed automatically, e.g., without a need for user initiation or user intervention after an initial configuration stage, and/or programmatically, e.g., by execution of program instructions on at least one computing device. In some embodiments, the access control service 100 may include additional components not shown, fewer components than shown, or different combinations, configurations, or quantities of the components shown.

Clients 10 of the access control service 100 may represent external devices, systems, or entities. In one embodiment, the client devices 10 may be implemented using any suitable number and configuration of computing devices, any of which may be implemented by the example computing device 3000 illustrated in FIG. 6. Clients 10 may convey network-based service requests to the access control service 100 via one or more networks, e.g., to request access to services. The network(s) may encompass any suitable combination of networking hardware and protocols necessary to establish network-based communications between client devices 10 and the access control service 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device 10 and the access control service 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device 10 and the Internet as well as between the Internet and the access control service 100. In one embodiment, client devices 10 may communicate with the access control service 100 using a private network rather than the public Internet. In various embodiments, the various components of the access control service 100 may also communicate with other components of the system using one or more network interconnects.

Figure 2:
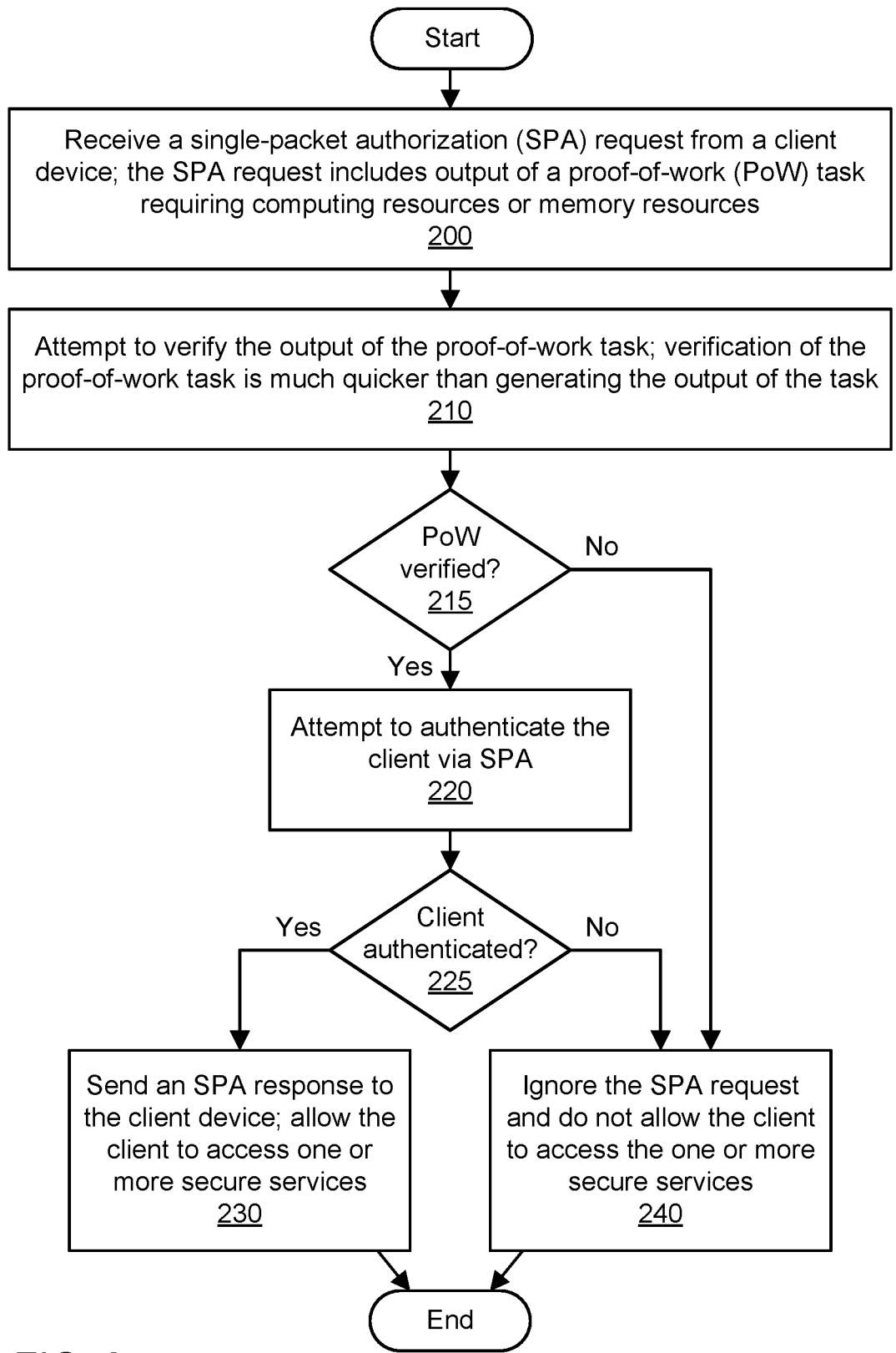
FIG. 2 is a flowchart illustrating a method for single-packet authorization using proof of work, according to some embodiments.

FIG. 2 is a flowchart illustrating a method for single-packet authorization using proof of work, according to some embodiments. As shown in 200, an access control service may receive an SPA request from a client device, e.g., from an SPA agent on the client device. The SPA request may include a single TCP or UDP packet that can authenticate a user to a system. The SPA request may include a hash of several values. The SPA request may include SPA credentials associated with the client, e.g., as a component of a hash value. The SPA request may include output of a proof-of-work task performed by the SPA agent, e.g., as a component of a hash value. The proof-of-work task may require significant computing resources and/or memory resources of the client device, while verification of the output of the task may require a much smaller amount of computing resources and/or memory resources of the access control service. In some embodiments, the proof-of-work task or the SPA request may be a function of SPA data, connection parameters, the epoch, and so on.

As shown in 210, the access control service may attempt to verify the correctness of the output of the proof-of-work task. Verification of the output of the proof-of-work task may be much quicker on the server side than generating the output of the task on the client side. By introducing a proof-of-work challenge to be performed by clients, the computational cost and/or resource cost of crafting the SPA packet on the client side may become orders of magnitude higher than the server cost to validate the challenge. By increasing the cost of staging a successful DDoS attack against the access control service, such an attack may be made less attractive to adversaries. As shown in 215, in response to determining that the proof-of-work is verified, then the method may proceed with the operation shown in 220. In response to determining that the proof-of-work is not verified, then the method may proceed with the operation shown in 240.

As shown in 220, the access control service may attempt to authorize the client via SPA, e.g., using the SPA credential(s) in the SPA request. As shown in 225, in response to determining that the SPA request is authenticated, then the method may proceed with the operation shown in 230. In response to determining that the SPA request is not authenticated, then the method may proceed with the operation shown in 240. As shown in 230, in response to determining that the client is authenticated, the access control service may send an SPA response to the client, and the client may be allowed access to one or more secure services via an SPA gateway using a session ticket granted by the SPA controller. As shown in 240, in response to determining that the proof-of-work is not verified or the client is not authenticated, the access control service may ignore the SPA request without providing access to any of the secure services. In such circumstances, the access control service may not acknowledge the SPA request. Using both SPA-based payload authentication and a proof-of-work approach, the access control service may prevent attacks against components such as the SPA controller and SPA gateway.

Figure 3:
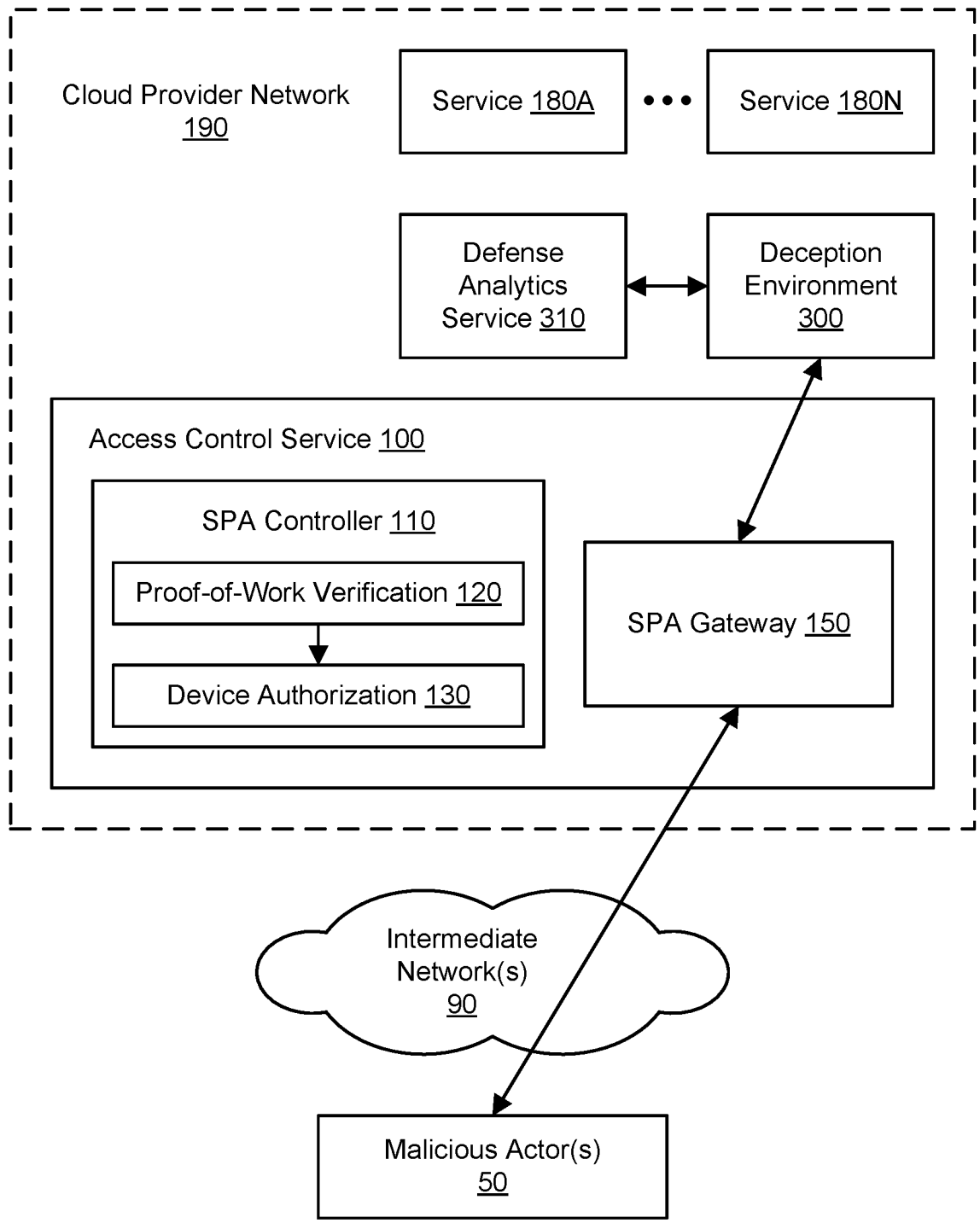
FIG. 3 illustrates further aspects of the example system environment for single-packet authorization using proof of work, including the use of a deception environment with defense analytics, according to some embodiments.

FIG. 3 illustrates further aspects of the example system environment for single-packet authorization using proof of work, including the use of a deception environment with defense analytics, according to some embodiments. In some embodiments, anyone attempting to access a secure service 180A without proper SPA credentials would either encounter no response (e.g., failed requests are discarded by the access control service 100) or would be routed into a deception environment 300 that is designed to fingerprint the client and characterize the threat. The threat intelligence gathered through the deception environment 300 may be leveraged to better protect services from internet-based threats. The intelligence generated through the deception environment may be consumed by a defense analytics service 310 such as an organization's Security Information and Event Management (SIEM) or threat intelligence systems to provide improved situational awareness across the organization's whole footprint. The deception environment 300 may be configured to generate and store only basic telemetry about the attackers without storing any sensitive information related to a customer of the access control service 100. The deception run on behalf of a specific customer of the access control service 100 may be configured to generate and provide for analysis a rich set of data, including malware payloads, whose retention and access can be controlled by the customer of the access control service. In various embodiments, an invalid SPA request (e.g., an SPA request without verifiable proof of work or without a valid SPA credential) or another invalid access attempt (e.g., an improper session ticket) from one of the malicious actors 50 may be ignored, or the malicious actor may instead be directed to the deception environment. In some embodiments, one of the malicious actors 50 may or may not be directed to the deception environment 300 dynamically, e.g., based (at least in part) on one or more parameters of the cloud provider network 190, the access attempt, or the malicious actor itself Organized adversaries may pragmatically target systems that allow them to maximize their profit. By using the access control service 100 and the proof-of-work approach to make initial reconnaissance more difficult, a target service 180A may be made much less attractive at an early stage to a malicious actor 50. Additionally, the deception environment 300 of the access control service 100 may provide improved situational awareness through early detection capability for adversaries looking for targets or actively attempting penetration. The deception environment 300 may permit automated mapping of adversary infrastructure and some insight into the adversary's tactics, techniques, and procedures using the defense analytics service 310.

Figure 4:
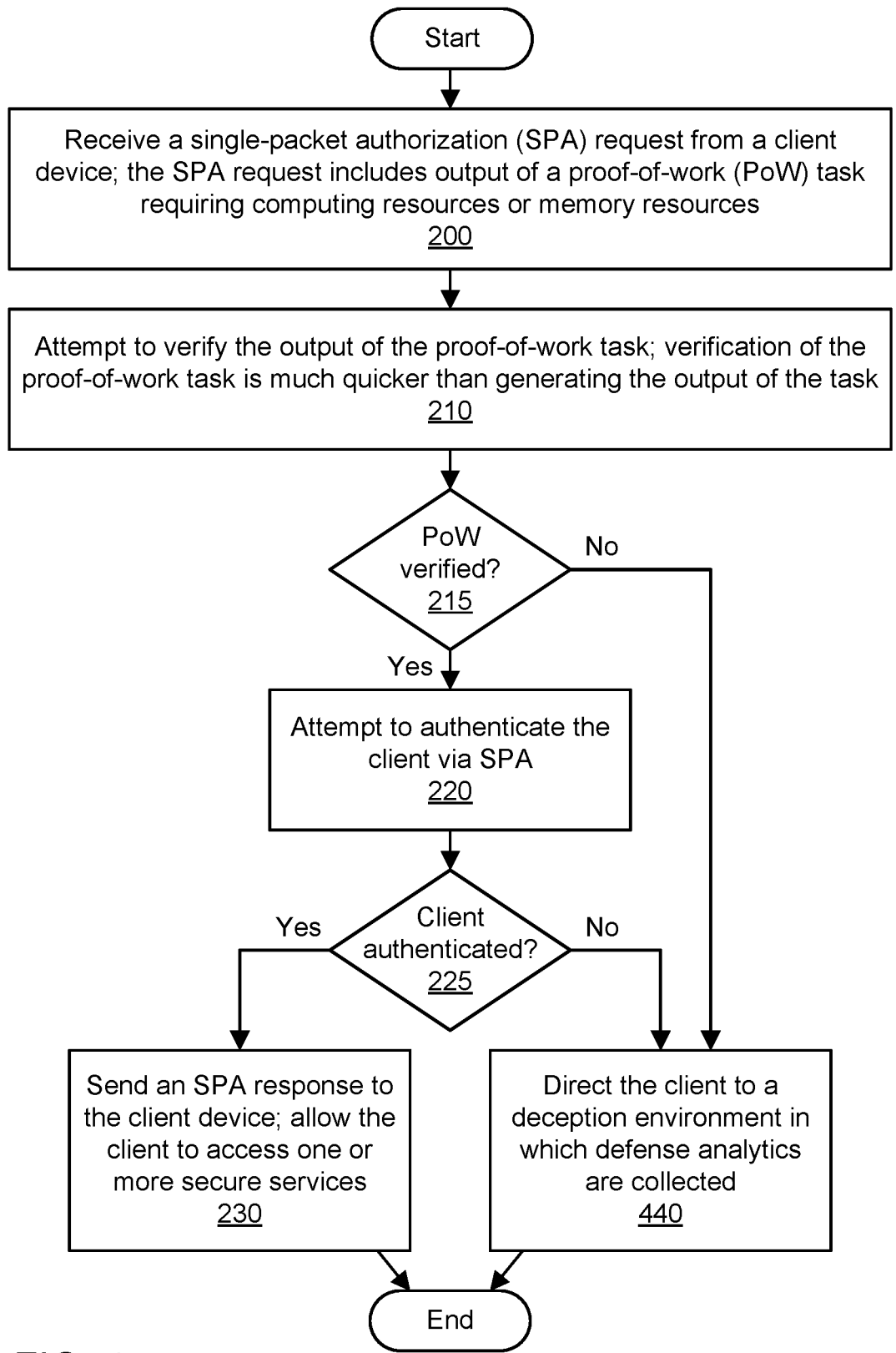
FIG. 4 is a flowchart illustrating a method for single-packet authorization using proof of work and a deception environment, according to some embodiments.

FIG. 4 is a flowchart illustrating a method for single-packet authorization using proof of work and a deception environment, according to some embodiments. FIG. 2 is a flowchart illustrating a method for single-packet authorization using proof of work, according to some embodiments. As shown in 200, an access control service may receive an SPA request from a client device, e.g., from an SPA agent on the client device. The SPA request may include a single TCP or UDP packet that can authenticate a user to a system. The SPA request may include a hash of several values. The SPA request may include SPA credentials associated with the client, e.g., as a component of a hash value. The SPA request may include output of a proof-of-work task performed by the SPA agent, e.g., as a component of a hash value. The proof-of-work task may require significant computing resources and/or memory resources of the client device, while verification of the output of the task may require a much smaller amount of computing resources and/or memory resources of the access control service. In some embodiments, the proof-of-work task or the SPA request may be a function of SPA data, connection parameters, the epoch, and so on.

As shown in 210, the access control service may attempt to verify the correctness of the output of the proof-of-work task. Verification of the output of the proof-of-work task may be much quicker on the server side than generating the output of the task on the client side. By introducing a proof-of-work challenge to be performed by clients, the computational cost and/or resource cost of crafting the SPA packet on the client side may become orders of magnitude higher than the server cost to validate the challenge. By increasing the cost of staging a successful DDoS attack against the access control service, such an attack may be made less attractive to adversaries. As shown in 215, in response to determining that the proof-of-work is verified, then the method may proceed with the operation shown in 220. In response to determining that the proof-of-work is not verified, then the method may proceed with the operation shown in 440.

As shown in 220, the access control service may attempt to authorize the client via SPA, e.g., using the SPA credential(s) in the SPA request. As shown in 225, in response to determining that the SPA request is authenticated, then the method may proceed with the operation shown in 230. In response to determining that the SPA request is not authenticated, then the method may proceed with the operation shown in 440. As shown in 230, in response to determining that the client is authenticated, the access control service may send an SPA response to the client, and the client may be allowed access to one or more secure services via an SPA gateway using a session ticket granted by the SPA controller. As shown in 440, in response to determining that the proof-of-work is not verified or the client is not authenticated, the access control service may direct the client into a deception environment that is designed to fingerprint the client and characterize the threat. The threat intelligence gathered through the deception environment may be leveraged to better protect services from internet-based threats. In some embodiments, the client may be ignored or may instead be directed to the deception environment dynamically, e.g., based (at least in part) on one or more parameters of the cloud provider network, the access attempt, or the malicious actor itself.

Figure 5:
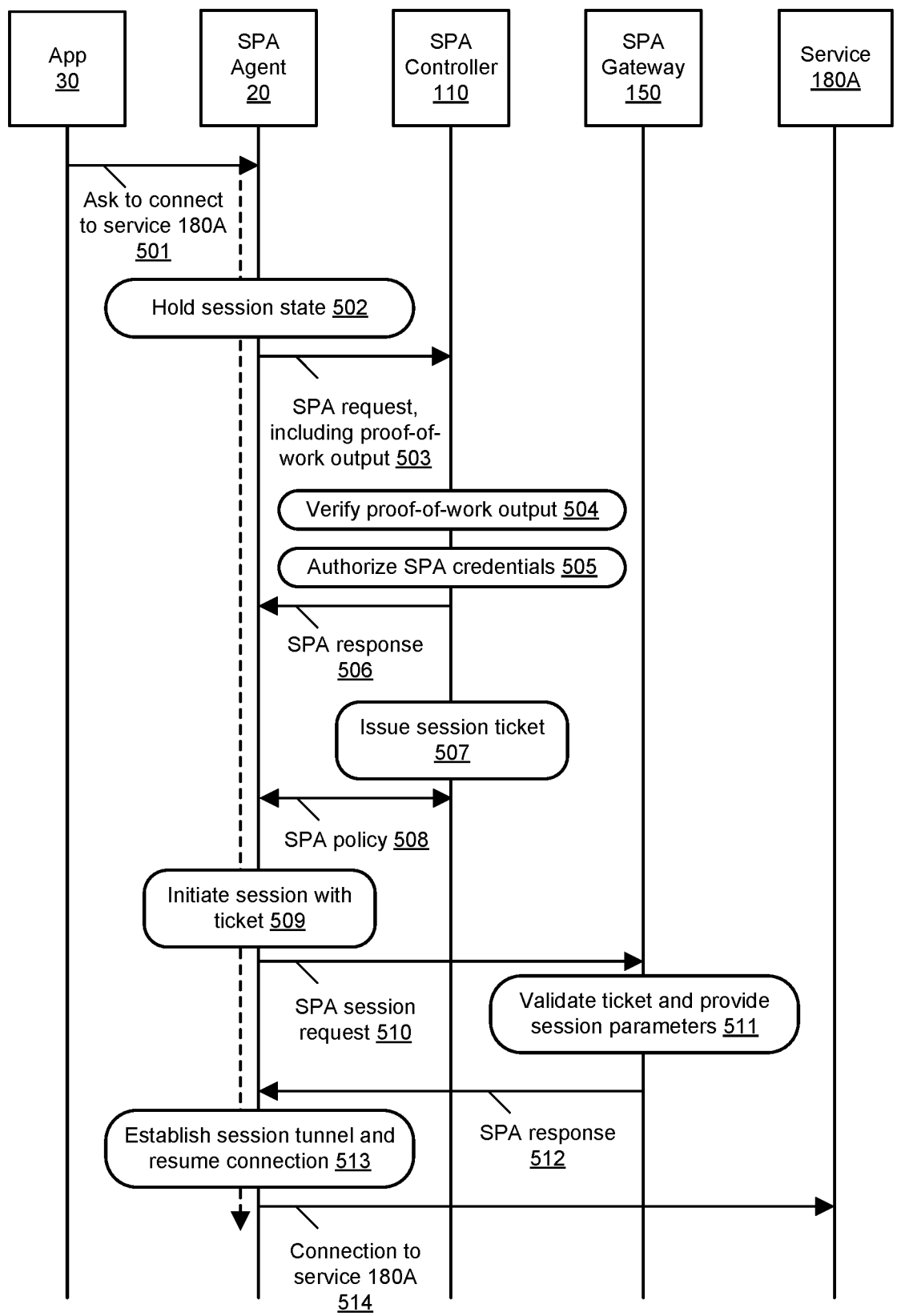
FIG. 5 is a sequence diagram illustrating a method for single-packet authorization using proof of work, according to some embodiments.

FIG. 5 is a sequence diagram illustrating a method for single-packet authorization using proof of work, according to some embodiments. As shown in 501, an application 30 may attempt to connect to a service 180A in provider network 190. The request may be intercepted by SPA agent 20 executing on the user's device 10 which holds the session state 502 while authentication is performed. For example, as shown in 503, the SPA agent 20 may send an SPA request to SPA controller 110. As discussed, the request can include a single packet (e.g., a UDP packet or other packet) that includes client credentials (e.g., a device identifier or other secure credentials that were provisioned when the SPA agent was set up on the user's device) to authenticate to the server. The SPA request may also include the output of a proof-of-work task.

The SPA controller 110 may receive the request and perform one of several actions. For example, the SPA controller 110 may perform verification of the proof-of-work task as shown in 504 and, in response to determining that verification is successful, authorize the SPA credentials as shown in 505. As shown in 506, the SPA controller 110 may return an SPA response that includes a session ticket. In some embodiments, the SPA controller 110 may determine that it is an invalid request (e.g., due to client not being provisioned, not using the right authorization credentials, and so on.) and provide the client with a ticket that will trigger redirection into deception environment at the SPA gateway 150. In some embodiments, the SPA controller 110 may determine that it is an invalid request as above and silently ignore it.

If the SPA agent 20 has been issued a valid ticket as shown in 507, then the agent may can use the ticket to initiate a TLS protected session with the SPA controller 110, as shown in 509, to submit its posture information and retrieve a policy 508 along with a directory of allowed services it is authorized to reach. At this point, the user device 10, via SPA agent 20, may be ready to initiate service requests. The SPA agent 20 may identify traffic initiated to services protected with the access control service 100. When such a service is requested, as shown in 510, the agent 20 may send an SPA session request to the SPA gateway 150 along with the service ticket obtained from SPA controller 110. The SPA gateway 150 may validate that the device/user policy for this session is allowed. If the session is not allowed because it cannot be validated, or the SPA gateway 150 receives unannounced traffic at any service port, it may have the option of directing the session in a deception environment based on its policy configuration and any proactive blocking that has been implemented. Alternatively, the SPA gateway may simply ignore any traffic that cannot be validated. If the session is successfully validated as shown in 511, then the SPA gateway 150 may negotiate session port rewriting pair for the SPA agent and itself and establish session-specific rules between the SPA agent 20 and the service 180A. These session parameters can be provided in an SPA response as shown in 512. As shown in 513 and 514, the SPA agent 20 may then establish a session tunnel using these session parameters with the requested service and provide the traffic that had been previously held by the SPA agent.

ILLUSTRATIVE COMPUTER SYSTEM

In at least some embodiments, a computer system that implements a portion or all of one or more of the technologies described herein may include a computer system that includes or is configured to access one or more computer-readable media. FIG. 6 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 6 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
an access control service comprising one or more processors and one or more memories to store computer-executable instructions that, when executed, cause the one or more processors to:
receive, from a client device, a single-packet authorization (SPA) request comprising an SPA credential and output of a proof-of-work task, wherein completion of the proof-of-work task requires performance of a computation by computational resources of the client device;
perform verification of the output of the proof-of-work task using fewer computational resources of the access control service to perform another computation for the verification than the computational resources used by the client device to perform the computation for the proof-of-work;
determine whether the verification of the output of the proof-of-work task succeeds or fails;
wherein, in response to determining that the verification of the output of the proof-of-work task succeeds, the access control service is configured to:
perform authentication of the client device based at least in part on the SPA credential, and
in response to determining that the authentication of the client device succeeds, allow access by the client device to a service; and
wherein, in response to determining that either the verification of the output of the proof-of-work task or the authentication of the client device fails, the access control service is configured to ignore the SPA request without providing access by the client device to the service.

2. The system as recited in claim 1, wherein the one or more memories store computer-executable instructions that, when executed, cause the one or more processors to:
prevent a denial of service attack on the service by a plurality of unauthorized clients, wherein the unauthorized clients fail to perform the proof-of-work task.

3. The system as recited in claim 1, wherein the one or more memories store computer-executable instructions that, when executed, cause the one or more processors to:
route access requests from a plurality of unauthorized clients to a deception environment based at least in part on a failure of the unauthorized clients to perform the proof-of-work task.

4. The system as recited in claim 1, wherein the one or more memories store computer-executable instructions that, when executed, cause the one or more processors to:
route access requests from a plurality of unauthorized clients to a deception environment based at least in part on a failed authorization of the unauthorized clients.

5. A method, comprising:
receiving, by an access control service from a client device, a single-packet authorization (SPA) request comprising output of a proof-of-work task, wherein completion of the proof-of-work task requires performance of a computation by computational resources or memory resources of the client device;
performing, by the access control service, verification of the output of the proof-of-work task using fewer computational resources or memory resources of the access control service to perform another computation for the verification than the computational resources or memory resources used by the client to perform the computation for the proof-of-work;
in response to determining that the verification of the output of the proof-of-work task succeeds, performing, by the access control service, authentication of the SPA request; and
in response to determining that the authentication of the SPA request succeeds, allowing, by the access control service, access by the client device to a service.

6. The method as recited in claim 5, wherein the verification of the output of the proof-of-work task is performed in less time than generating the output of the proof-of-work task.

7. The method as recited in claim 5, wherein the SPA request comprises an SPA credential, and wherein the authentication of the SPA request is performed based at least in part on the SPA credential.

8. The method as recited in claim 5, wherein the output of the proof-of-work task comprises a function of SPA data, a nonce value, and an epoch value.

9. The method as recited in claim 5, wherein the proof-of-work task is performed using a plurality of secure hash functions.

10. The method as recited in claim 5, further comprising:
in response to determining that the verification of the output of the proof-of-work task or the authentication of the SPA request fails, ignoring, by the access control service, the SPA request without providing access by the client device to the service.

11. The method as recited in claim 5, further comprising:
in response to determining that either the verification of the output of the proof-of-work task or the authentication of the SPA request fails, directing, by the access control service, the client device to a deception environment.

12. The method as recited in claim 5, further comprising:
preventing, by the access control service, discovery of the service by one or more unauthorized clients.

13. One or more non-transitory computer-readable storage media storing program instructions that, when executed on or across one or more processors, perform:
receiving, by an access control service from a client, a single-packet authorization (SPA) request comprising output of a proof-of-work task, wherein completion of the proof-of-work task requires performance of a computation by computational resources of the client;
performing, by the access control service, verification of the output of the proof-of-work task using fewer computational resources of the access control service to perform another computation for the verification than the computational resources used by the client to perform the computation for the proof-of-work;
in response to determining that the verification of the output of the proof-of-work task succeeds, performing, by the access control service, authentication of the client; and
in response to determining that the authentication of the client succeeds, allowing, by the access control service, access by the client to a service.

14. The one or more non-transitory computer-readable storage media as recited in claim 13, wherein the client is issued a session ticket by the access control service, and wherein access by the client to the service is established using the session ticket via an SPA gateway.

15. The one or more non-transitory computer-readable storage media as recited in claim 13, wherein the output of the proof-of-work task comprises a function of SPA data, a nonce value, and an epoch value.

16. The one or more non-transitory computer-readable storage media as recited in claim 13, wherein the output of the proof-of-work task comprises a function of SPA parameters.

17. The one or more non-transitory computer-readable storage media as recited in claim 13, wherein the proof-of-work task is performed using a plurality of secure hash functions.

18. The one or more non-transitory computer-readable storage media as recited in claim 13, further comprising additional program instructions that, when executed on or across the one or more processors, perform:
in response to determining that the verification of the output of the proof-of-work task or the authentication of the client fails, discarding, by the access control service, the SPA request without providing access by the client to the service.

19. The one or more non-transitory computer-readable storage media as recited in claim 13, further comprising additional program instructions that, when executed on or across the one or more processors, perform:
in response to determining that either the verification of the output of the proof-of-work task or the authentication of the client fails, routing, by the access control service, the client to a deception environment.

20. The one or more non-transitory computer-readable storage media as recited in claim 13, further comprising additional program instructions that, when executed on or across the one or more processors, perform:
preventing, by the access control service, port scanning of the service by one or more unauthorized clients.

* * * * *